United States Patent [19]

Blanchard

[11] Patent Number: 4,893,115

[45] Date of Patent: Jan. 9, 1990

[54] TOUCH SENSITIVE VISUAL DISPLAY SYSTEM

[75] Inventor: Randall D. Blanchard, Marysville, Wash.

[73] Assignee: John Fluke Mfg. Co., Inc., Everett, Wash.

[21] Appl. No.: 129,873

[22] Filed: Dec. 4, 1987

Related U.S. Application Data

[63] Continuation of Ser. No. 767,417, Nov. 12, 1985, abandoned.

[51] Int. Cl.[4] .............................................. G06F 3/033
[52] U.S. Cl. ...................................... 340/712; 341/22; 341/23
[58] Field of Search ........... 340/706, 711, 712, 365 C, 340/365 VL; 200/159 B, 5 R, 5 A, 314, 313, DIG. 1; 341/33, 22, 23

[56] References Cited

U.S. PATENT DOCUMENTS

| | | | |
|---|---|---|---|
| 3,772,685 | 11/1973 | Masi | 340/365 C |
| 3,971,013 | 7/1976 | Challoner et al. | 340/712 |
| 4,290,061 | 9/1981 | Serrano | 340/712 |
| 4,363,029 | 12/1932 | Piliavin et al. | 340/365 C |

FOREIGN PATENT DOCUMENTS

| | | | |
|---|---|---|---|
| 0059830 | 5/1979 | Japan | 340/365 VL |
| 0204938 | 12/1982 | Japan | 340/365 VL |
| 0020236 | 2/1985 | Japan | 340/365 VL |

Primary Examiner—Alvin Oberley
Attorney, Agent, or Firm—Mikio Ishimaru; Stephen A. Becker; Michael J. Strauss

[57] ABSTRACT

A flat panel visual display system having orthogonally disposed display electrodes which are provided by display command signals from a computer to cause activation of portions of the display is provided with additional electrodes. The additional electrodes are orthogonally disposed in a plane parallel to the display electrodes and are interconnected so that an operator touching the additional electrodes will shunt at least a portion of the display command signals to ground or back to the computer. The computer is provided with sensor circuitry for sensing the shunting and providing an indication of the location of the simultaneous occurrence of the display command signals and the operator's touch.

39 Claims, 8 Drawing Sheets

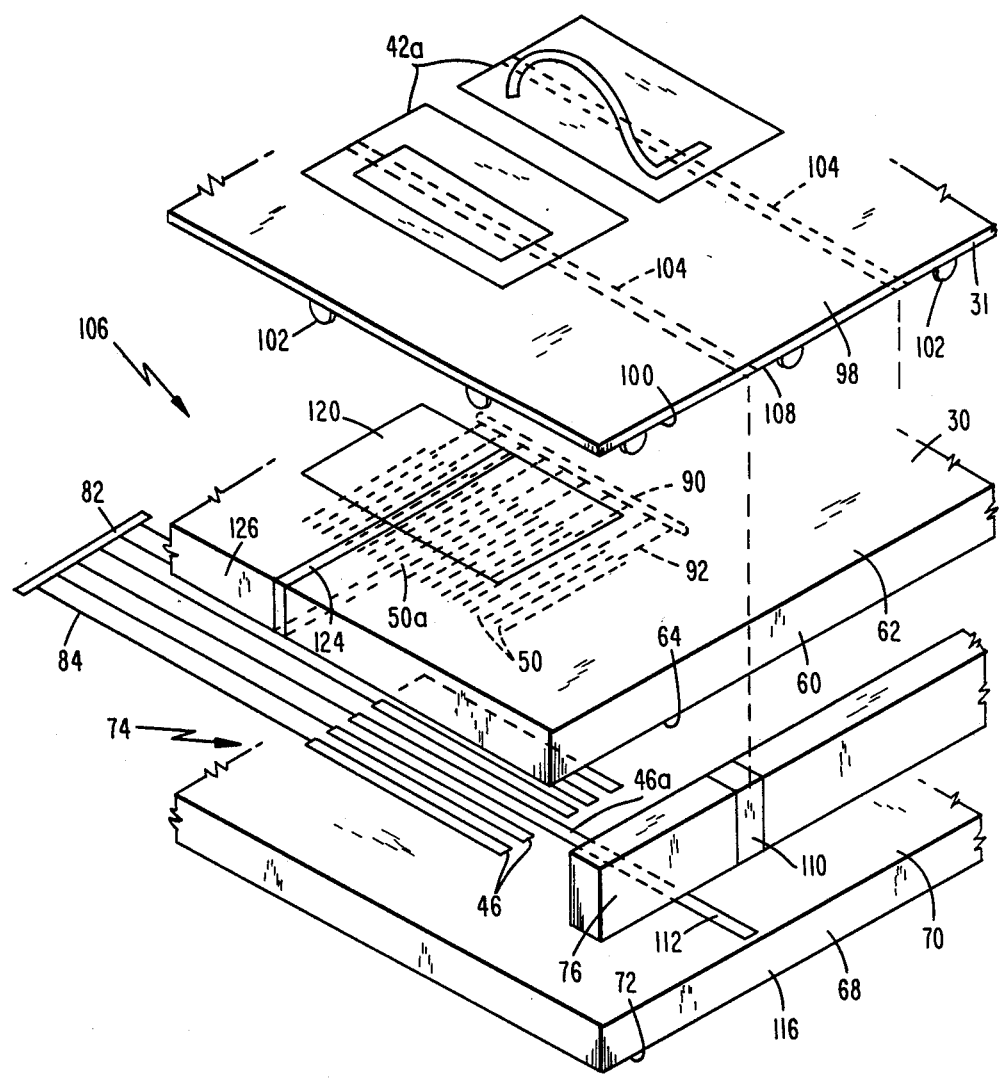

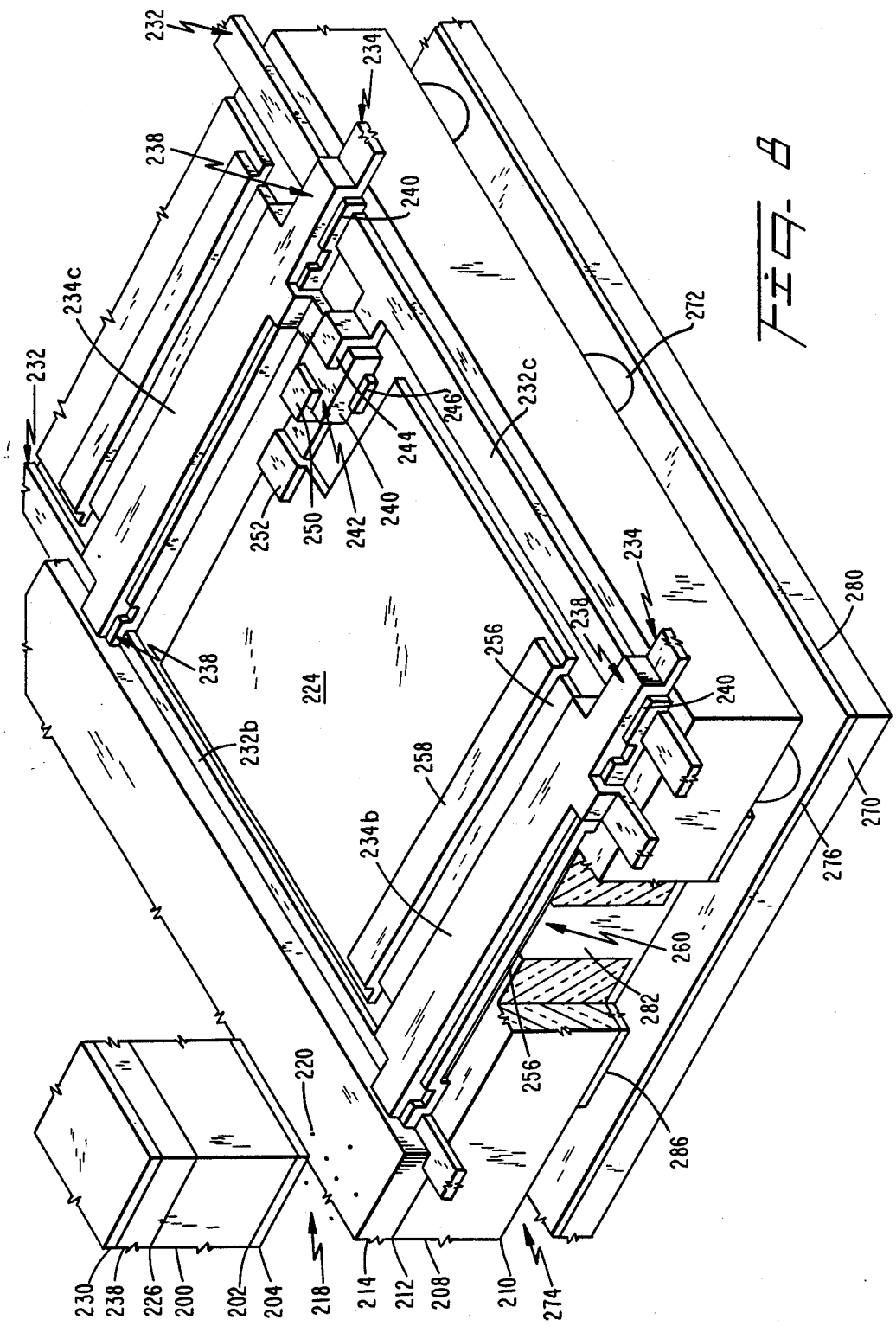

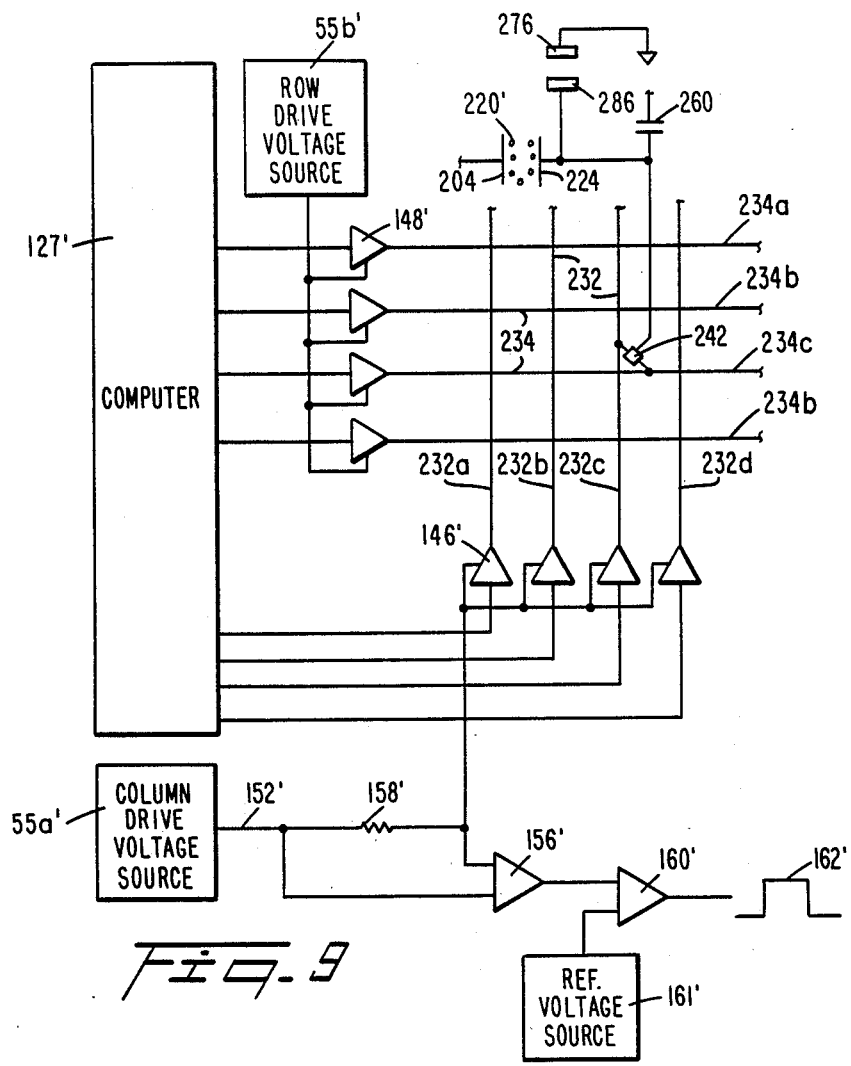
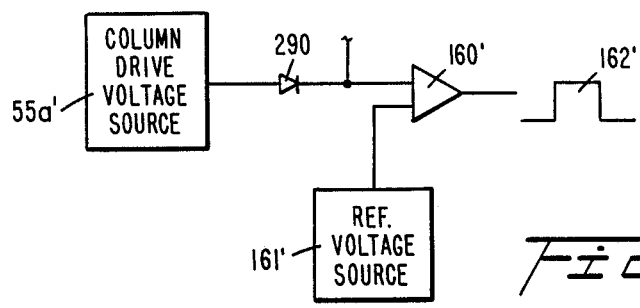

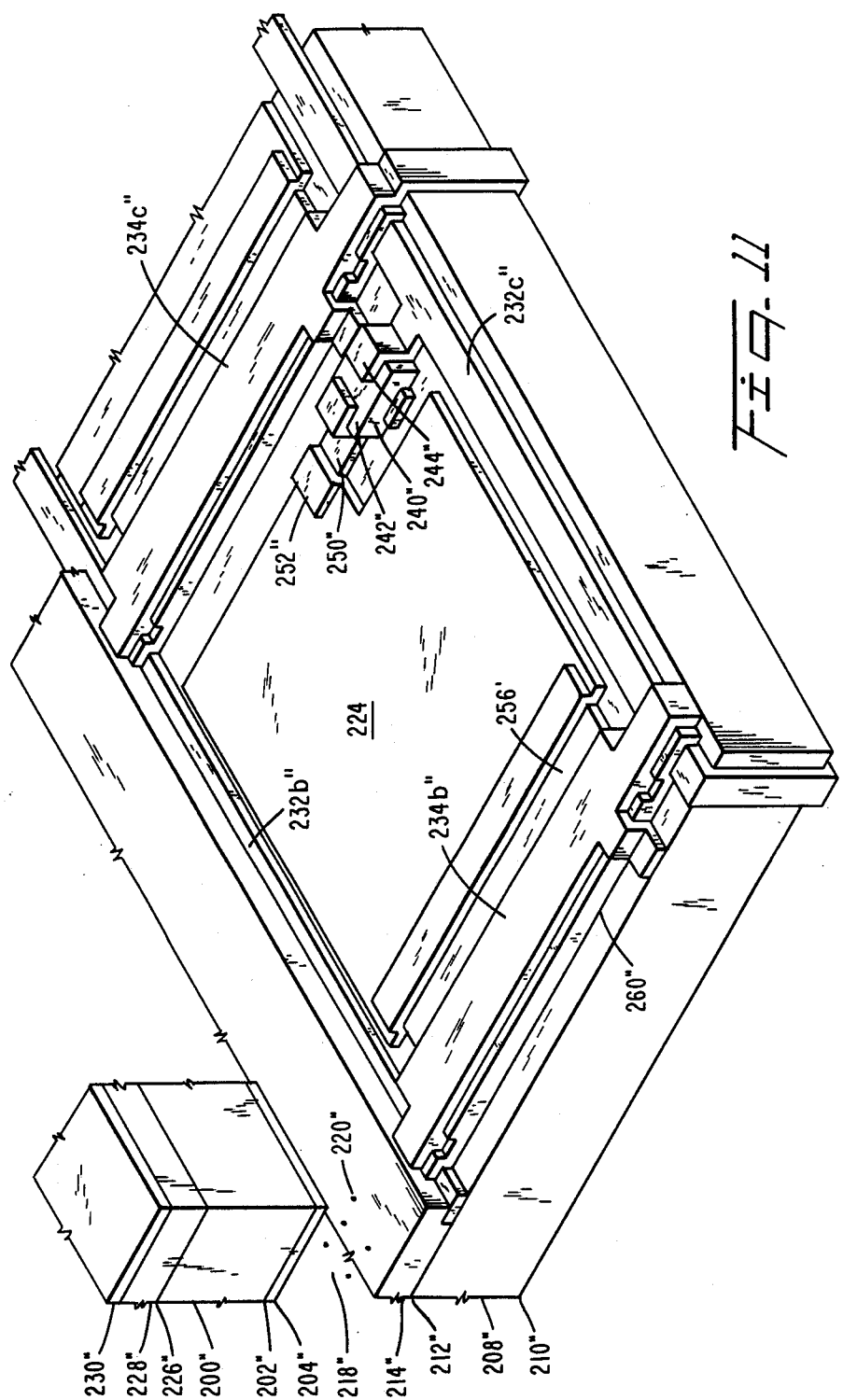

TOUCH SENSITIVE VISUAL DISPLAY SYSTEM

This application is a continuation of Application Ser. No. 767,417, filed Nov. 12, 1985, now abandoned.

FIELD OF THE INVENTION

The present invention relates generally to visual displays which are touch sensitive for operator interaction with a visual or graphic display of a host system, such as a computer, and which permit the localized identification of positions on the display upon a manual touch thereat by the operator. More particularly, the present invention relates to touch sensitive visual display systems utilizing flat panel display technologies of both the active and passive types.

BACKGROUND OF THE INVENTION

Computer technology continues to expand at an enormous rate and the level of the expertise of users is expected to decline at a similar rate. In order to allow these inexpert operators to interface properly with sophisticated computer systems, numerous devices have been developed to eliminate the need for complete dependency upon the use of a keyboard for entry of information.

One means of facilitating the interaction between the operator and the computer is a touch sensitive panel overlaying the display screen of the computer. The touch sensitive panel is designed so that a touch contact applied at a particular location causes the generation of a meaningful signal to a software controlled microprocessor. Data presented on the face of the screen provides options to the operator or asks various questions. Possible alternatives or responses to the questions are also provided on the screen. By contacting the touch sensitive panel at the location where the desired response or answer appears upon the screen, the desired response is sent to the microprocessor to update the display, perform a desired operation, or provide new options for the operator to respond to.

In the past, computers have typically utilized a cathode ray tube (CRT) for display purposes because of cost. For example, a touch sensitive CRT display system is disclosed in applicant's co-pending application, Ser. No. 448,947, filed Dec. 13, 1982, now U.S. Pat. 4,567,430. In this application, the raster scan system of a CRT is used in conjunction with a photovoltaic overlay to allow position detection of a touch relative to images on the display.

Another example of a touch sensitive system used with CRTs is disclosed in U.S. Pat. No. 4,423,299 granted Dec. 27, 1983 to M. Gurol, et al. In this system, an orthogonal arrangement of transparent strips are used to provide switches for locating positions on a CRT display. Essentially, one set of strips is placed on the display and another set at right angles is placed on a flexible membrane which is separated from the display. By touching the flexible membrane to the display, contact is made between the conductive strips to close a circuit which indicates the location of the touch approximately relative to the images on the display.

More recently, so called "flat panel display" technologies have been developed which provide an alternative to the conventional CRT. These flat panel displays are smaller, lighter, and more compact than a conventional CRT. Some flat panel displays have a depth of less than one and one-half inches. In addition, many flat panel displays require much lower power for their operation that a CRT. Currently, they are more expensive than CRT's, but the price is expected to be lower with advances in technology. Flat panel displays generally fall into two categories of "active" and "passive" types.

The active type displays include light emitting diode (LED) displays, various types of plasma displays, vacuum fluorescent displays (VFDs), and thin film electroluminescent (TF-EL) displays. Recently, flat cathode ray tubes and electrophoretic displays have been developed and added to this category.

The passive type displays include liquid crystal displays (LCDs) and electrochromic displays.

Essentially, these displays consist of a pair of electrodes having a display medium disposed therebetween which is responsive to electric fields imposed on the electrodes. The active displays have materials or gasses which emit light under the stimulus of the field. The passive displays generally reflect or transmit light depending on the electric fields and do not in and of themselves emit light.

One example of an active display is the gas plasma display. The gas plasma display utilizes two panels of glass to enclose a gaseous mixture consisting principally of neon. An electrode is disposed on each of the glass panels and the application of an AC or DC voltage across the electrodes causes the gas to ionize and emit light.

The liquid crystal display is typical of the passive type display. In a liquid crystal display, two panels of glass enclose a liquid having crystaline properties. When a DC voltage or a multiplexed AC voltage is applied across the liquid crystal, the liquid crystal orients itself from its normal transparent state, which allows the reflection of ambient light from a reflective surface on the back glass plate, to an opaque state.

To provide alphanumeric or graphic information on a flat panel display, a grid of electrodes is generally used on either side of the display material. In a display having a picture, each pair of electrodes is known as a pixel and is generally located in an X-Y orthogonal matrix. To cause the pixels to provide a display by either emitting light or changing reflectivity, a drive electronics technique known as matrix addressing is used. In matrix addressing, each pixel is related to a set of coordinates in the matrix and has a row and column address. Each of the pixels has one terminal connected together with other pixels in a row, and the other terminal connected with other pixels in a column located orthogonally to the row. When a pixel is selected, a voltage is applied to its corresponding row and column leads to define the coordinates of the selected pixel. In order to avoid activating invalid pixels, the row and column leads are multiplexed so only one row lead and one column lead receives an electrical signal (addressed) at a given instant in time.

The matrix addressing of large displays requires a very high rate of multiplexing which results in signal pulses having very short duty cycles which may be insufficient to cause a response in the display medium. In addition, some display medium, such as liquid crystal materials, have reduced visual performance using the short pulses. In order to overcome these problems, a transistor or diode switch in combination with a storage capacitor is incorporated at each pixel matrix junction. The capacitor, charged by the transistor provides a sufficiently long pulse across the display medium to cause a visual response.

Touch sensitive display systems have been developed for flat panels, but these are generally combinations of flat panel technology with previously existing capacitive touch switch technology. In an article by P. W. Alexander and D. A. Levien, DCEL Displays With Integrated Fixed Legend and Dot Matrix Touch Switches, SID 84 DIGEST, pp. 189-191 (1984), there is disclosed a capacitive touch switch overlay for a DC electroluminescent display in which a matrix array of display cathodes and display anodes are used to provide an excitation across a luminescent medium. The switch sensing is achieved by pulsing the anode driver enable line to cause all anodes to be driven simultaneously.

Heretofore, there has been developed no touch sensitive system which could be easily and economically utilized with both active and passive displays.

SUMMARY OF THE INVENTION

The present invention provides a touch sensitive function to a visual display which operates by providing signals to portions of the display. The system provides for shunting at least a portion of the display signal and being able to detect the shunting where the display signals are generated.

The above and additional advantages of the present invention will become apparent to those skilled in the art from a reading of the following detailed description when taken in conjunction with the accompanying drawings:

BRIEF DESCRIPTION OF THE DRAWINGS

FIG. 6 is an exploded cutaway isometric view of an alternate embodiment of the present invention showing a portion of a flat panel display including a touch sensitive section incorporating a conductive touch electrode pad in electrical communication with an X-oriented display electrode, and adapted to engage a flexible electrode in communication with a Y-oriented display electrode upon inward deflection of the flexible electrode by an operator's touch therewith;

FIG. 8 is an exploded cutaway isometric rear view of another alternate embodiment of the present invention showing a portion of a flat panel display incorporating a switching device controlled by signals on a matrix of conducting elements, and a touch sensitive portion having a conductive portion which is placed in electrical communication with the voltage output device when the touch sensitive portion is deflected inwardly by a touch;

FIG. 9 is a schematic diagram of an alternate embodiment showing the display drive conductive matrix and associated signal generating electronics, which is utilized in the embodiment of FIG. 8, and which provides an identifiable signal output indicative of the touch location;

FIG. 10 is a schematic diagram of a modification of the alternate embodiment of FIG. 9 which utilizes a voltage application rather than a grounding to provide the touch location;

FIG. 11 is an isometric rear view of another alternate embodiment of the present invention showing a portion of a flat panel display incorporating two sets of electrodes, wherein one of the sets is supported on an inner surface of the flat panel display and in communication with a junction of matrix electrodes for driving the flat panel display;

DESCRIPTION OF THE PREFERRED EMBODIMENT

Figure 1:
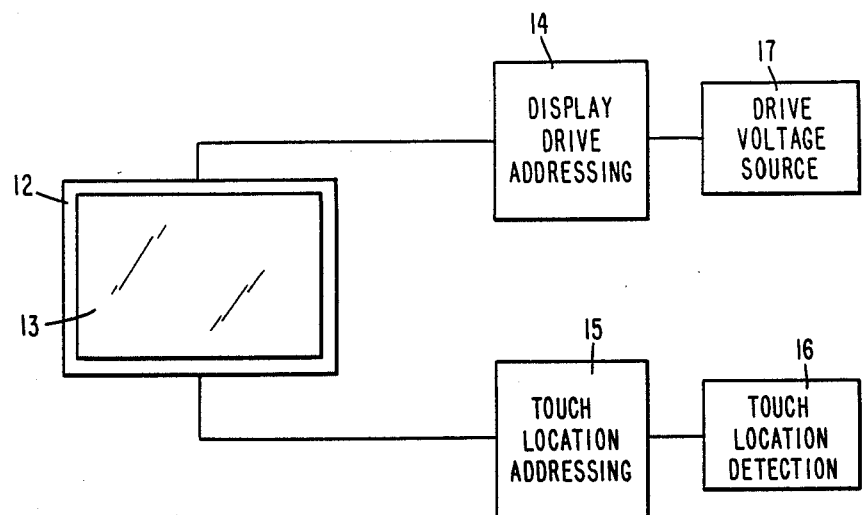
FIG. 1 is a simplified block diagram of a prior art visual display apparatus including a touch location system.

Referring to FIG. 1 there is shown a block diagram of conventional touch sensitive resistive overlay system including a display screen 12 and an optically transparent touch sensitive membrane 13 overlaying display screen 12. Display drive addressing electronics 14, driven by drive voltage source 17, applies an output to screen 12 to generate a visible pattern thereon. In order to process the selected response of the operator, the computer must locate the position of the operator's touch contact upon the overlay, determine the data displayed there, and coordinate this data with the displayed option or request. This is accomplished by conventional touch location addressing electronics 15 which are distinct from the conventional drive electronics 14 used to generate the visual display. In conventional touch sensitive visual display systems, the display drive addressing electronics 14 and the touch location addressing electronics 15 are activated alternately. Therefore, when signals are generated by the drive electronics 14, the touch location addressing electronics 15 are inactive, and vice versa.

Typically, when the touch sensitive overlay 13 is contacted by the operator, a signal is output which is indicative of the position of the contact. One type of switch available in the touch location sense electronics 15 is a membrane switch which is utilized for operator interaction with a CRT computer system. A resistive membrane switch comprises two planar members which are disposed in a face-to-face relationship wherein the inner surface of a first planar member, having a transparent surface, includes a plurality of parallel electrodes oriented in an X-direction, and the inner surface of a second transparent planar member includes a plurality of parallel conductive traces oriented in a Y-axial direction. The planar members comprising the overlay are placed over the CRT screen, and when a finger or stylus presses the first planar member into the second planar member behind it, the contact between the two members causes one of the X conductive traces to be "shorted" to one of the Y conductive traces causing an increase in the current through the X and Y conductive traces. This current increase is sensed by touch location detection circuitry 16 to determine the X, Y coordinates of the finger or stylus contact on the overlay 13.

Figure 2:
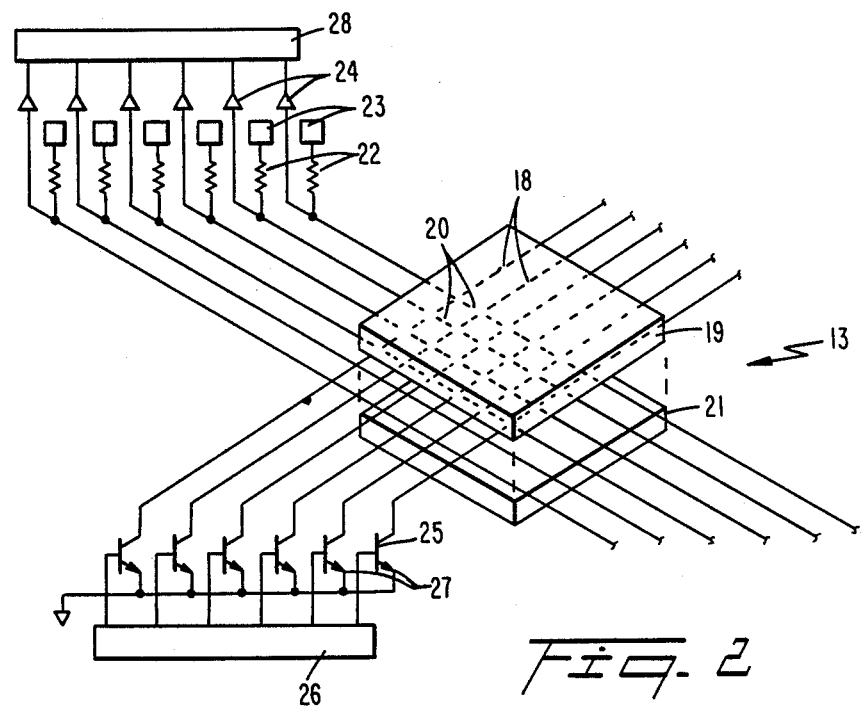
FIG. 2 is a diagram of a prior art touch panel switch overlay including an isometric view of parallel optically transparent panels having opposing conductive elements defining a conductive matrix, and a schematic of touch location sense electronics.

A representative schematic of the touch location addressing and detection portion of a conventional touch sensitive resistive overlay system is illustrated in FIG. 2, wherein is shown a plurality of spaced apart parallel row electrodes 18 oriented in an X-axial direction disposed on an inner surface of a front panel 19 of optically transparent overlay 13. In addition, a plurality of spaced apart parallel column electrodes 20 are oriented in a Y-axial direction and disposed on an inner surface of a rear panel 21 of optically transparent overlay 13. The front panel 19 and the rear panel are separated conventionally by an air gap which electrically isolates the row electrodes 18 from the column electrodes 20.

At the terminus of each column electrode 20 is a pull up resistor 22 connected to a reference voltage 23, and a comparator 24 which detects a change in voltage across pull up resistor 22. Each row electrode 18 terminates with a transistor 25 addressed by scan logic 26 and has an emitter 27 tied to ground. Contact of an "active" row electrode 18 in which transistor 25 is activated, with a column electrode 20, causes a change in voltage across the related column electrode pull up resistor 22, to cause a change in the output of comparator 24. The output from comparator 24 is fed to sense logic 28 which outputs the address of contacting column electrode. The location of the touch is defined by the coordinates of the contacting active row electrode and the contacting column electrode. This assembly is intended to be placed over conventional visual display apparatus.

Figure 3:
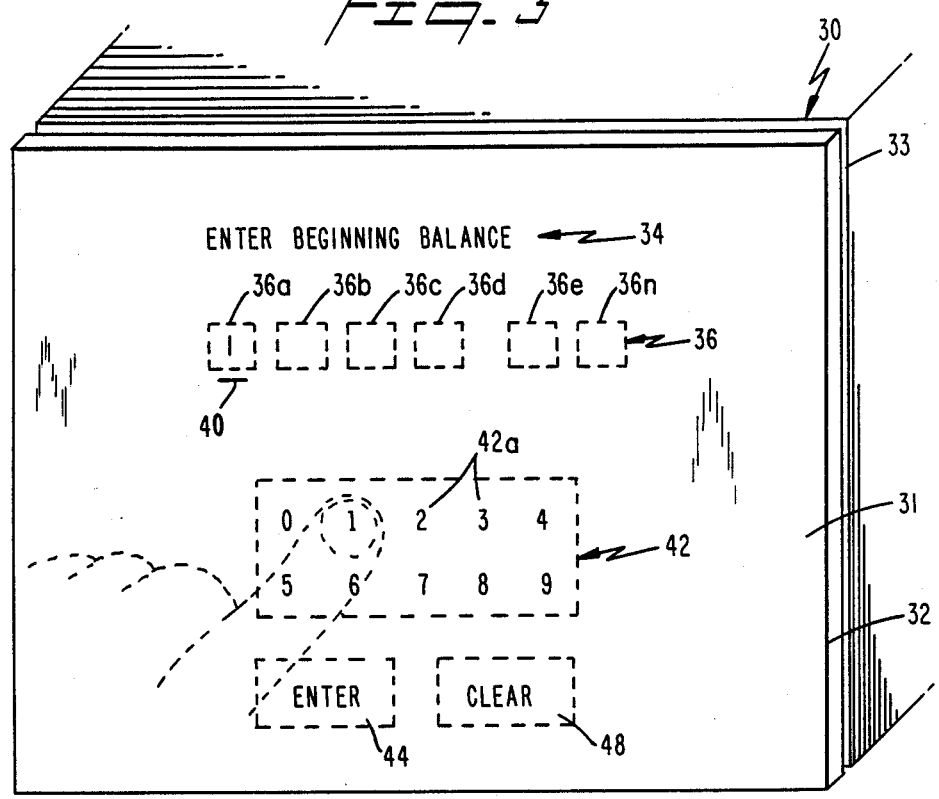
FIG. 3 is a diagrammatic isometric view of a visual display and an overlay in accordance with the present invention, here showing an exemplary situation requiring operator interaction with a computer system by manually touching the overlay to input selected data.

Referring now to the present invention shown in FIG. 3, there is illustrated a visual display apparatus indicated at 30 including a touch sensitive membrane 31 which overlays a flat panel display 32 including screen 33. The flat panel display 32 includes conventional display drive electronics described previously which incorporate spaced apart row and column electrodes to transmit a voltage through a display medium therebetween which activates the display medium, such as liquid crystal, gas plasma or luminescent material, to create a visual display of information. As will be explained in more detail later, each row and column electrodes comprises a plurality of individual parallel conductive traces. The row and column traces are oriented orthogonally to each other to form a matrix with each crossing location of the matrix identified by an address defining a set of unique coordinates. By addressing a selected set of unique coordinates, patterns of picture elements are displayed on screen 33 to visually transmit information to an operator.

In the exemplary display shown in FIG. 3, the flat panel display 32 is a part of a computer system (not shown) known to those of ordinary skill in the art and having a memory which stores a general purpose routine for providing information at screen 33—in this case, a routine for balancing a bank account. The computer system has presented through panel display 32 an instructional step "Enter Beginning Balance" within a field 34 located at an upper part of screen 33. Immediately below field 34 is a character field 36 comprised of individual character cells 36a through 36n within which will be entered the required balance information by the operator. A cursor 40 appears beneath that character cell 36a within which a selected digit is to appear; a digit "1" having been entered by the operator in the first cell location. The digit "1" is entered within field 36 by the operator touching the corresponding digit location within a digit field 42, comprising individual character cells 42a displaying digits "0" through "9". For example purposes, the operator's finger is shown in phantom applied to the digit "1" of digit field 42. After that initial digit is entered, cursor 40 indexes to the next adjacent character cell location 36b, and a selected digit from field 42 is again entered therein in the same manner—i.e., by touching the proper location within field 42. After the character information is located within the entry positions of field 36, the operator may touch a field 44 located below digit field 42 and bearing the legend "Enter" thereon in order to transfer the balance information to the computer system (not shown). Subsequently, the display may then present an instructional step for the operator to make withdrawals from the account in order to continue with the routine. In the event an incorrect digit is touched by the user, an area 48 bearing the legend "Clear" is provided to reset field 36 in order to enter correct information. Therefore, interaction between the operator and the computer system is simplified by observing a display at screen 33 and touching overlay 31 is directed by visual cues provided by the computer system.

Figure 4:
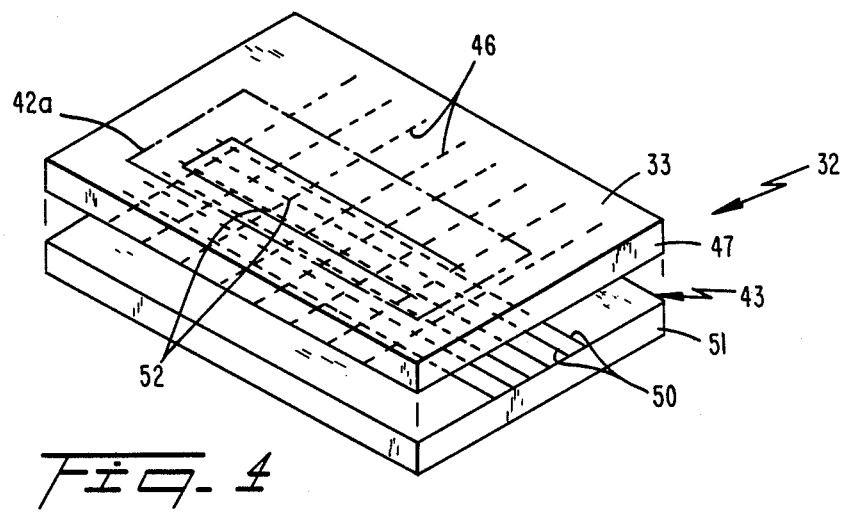
FIG. 4 is a magnified isometric view of a portion of the display shown in FIG. 3 depicting a character cell and underlying matrix of electrodes which provide paths for delivering display command signals to a display medium located between the electrodes.

In order to further describe the operation of display 32, reference is made to FIG. 4 which illustrates a magnified view of display 33 including character cell 42a displaying the digit "1" therein. In order to provide a visual display of the digit "1", there are a plurality of parallel row conductive elements 46 spaced apart across screen 33 and occupying a first horizontal plane 47. A second plurality of parallel column conductive elements 50 are spaced apart across screen 33 orthogonally to row elements 46 to occupy a second horizontal plane 51 wherein horizontal planes 47, 51 are spaced apart a predetermined distance. The crossing locations of a row element 46 with a column element 50 each define a location or junction 52. Each row element and column element is identified by a specific address; and, therefore each junction 52 may be identified by the combination of a row address and a column address as a selected set of coordinates. Located between row elements 46 and column elements 50 is a display medium 43, such as liquid crystal or ionizable gas, which responds to an electric field created by a display command potential between row electrodes 46 and column electrodes 50, to reorient the liquid crystals therein to become opaque in the case of liquid crystal display or to change color for an electrochromic display, or to cause the emission of light therefrom as in the case of an LED, gas plasma, vacuum fluorescent, electrophoretic or electroluminescent display. The electric field created at junctions 52 actuates elements of the display picture (pixels). Therefore, identifiable digits are visually created at screen 33 by addressing the appropriate row electrodes 46 and column electrodes 50 to apply a voltage differential at the selected junction 52 to define the selected characters or digits displayed at screen 33. In FIG. 4, selected row electrodes 46 and column electrodes 50 are addressed to define the digit "1" at display 32.

Addressing of row electrodes 46 and column electrodes 50 is typically accomplished by a microprocessor subsystem of the computer display system which includes the necessary memory elements to store the software for selecting the row and columns to be addressed in providing a visual display at screen 33. Typically, the rows and columns are addressed in a multiplexed arrangement wherein one of the column electrodes 50 is addressed, and then the selected rows 46 are sequentially addressed from top to bottom. Subsequently, a selected succeeding column 50 is addressed and the selected rows 46 are sequentially addressed again from top to bottom. The multiplexing rate is a function of size of the display and the characteristics of the display medium in order to obtain the desired visual display across screen 33. The upstream electronics for addressing row electrodes 46 and column electrodes 50 are well understood by those with ordinary skill in the art and will not be described in further detail herein.

Figure 5:
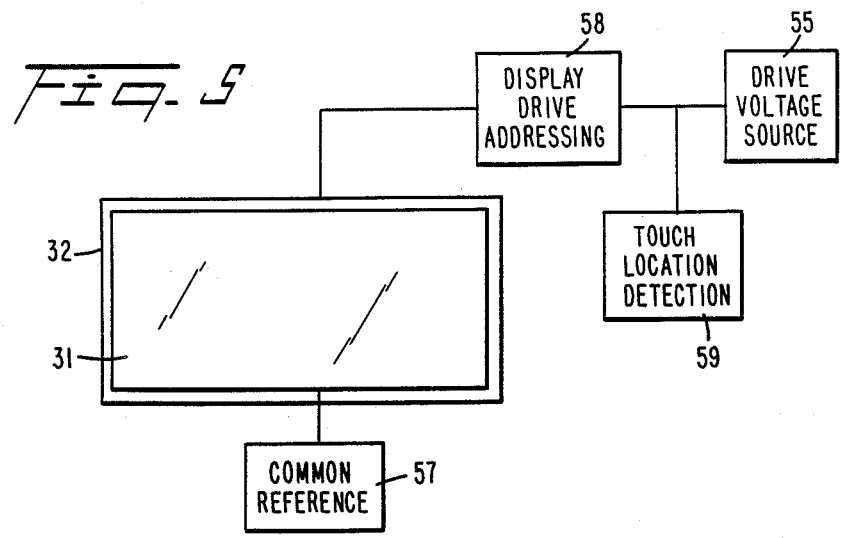
FIG. 5 is a simplified block diagram of the visual display apparatus of the present invention including visual display drive means and touch position detection means.

Referring to FIG. 5, there is shown a preferred embodiment of the present invention including touch sensitive membrane 31 connected to a common reference 57. The visual display 32 is connected to display drive addressing electronics 58 and drive voltage source 55 with a sensor which is location detection circuitry 59. Unlike conventional visual displays described with reference to FIGS. 1 and 2, the present invention does not utilize a separate network of touch location addressing electronics to determine touch location on overlay 31. Rather, the present invention utilizes the display command signals generated by the control circuitry which is designated as the display drive addressing electronics 58. By "shunting" at least a portion of a particular pixel display command signal that signal is modified so it can be used by the location detection circuitry 59 to determine the touch location in a manner to be described hereinafter.

Reference is now made to FIG. 6 where there is shown an embodiment of the present invention comprising a portion of a flat panel display 32, such as a liquid crystal display, electroluminescent display, gas plasma display or similar display, which incorporates a network of spaced apart electrodes to create an electric field for actuating a visual display medium. Flat panel display system 30 includes an optically transparent front panel screen 60 having a front surface 62 and a rear surface 64. Spaced apart and disposed parallel to optically transparent front panel 60, in an optically transparent rear panel 68 having a front surface 70 and a rear surface 72. In order to provide a chamber 74 for enclosing a display medium, such as a liquid crystal or the like, front panel 60 is spaced apart from rear panel 68. A first set of optically transparent electrodes 46 are disposed in a spaced apart, parallel relationship on front surface 70 to conduct an addressed electrical signal from the computer (not shown) via edge connector 82 and connector leads 84. In order to form a conductive matrix as was described in reference to Fig. 4, another set of optically transparent electrodes 50 are disposed in a spaced apart parallel relationship on rear surface 64 to conduct an electrical signal from the computer via edge connector 90 and connector leads 92. Electrodes 46 and 50 form a matrix pattern for providing an electrical field across chamber 74 and the display medium therein as was described previously. Electrodes 46, 50 are typically comprised of an optically transparent conductive material such as indium tin oxide.

In order to provide an operator interface with the computer system, there is provided flexible touch sensitive membrane 31, having a forward surface 98 and a rear surface 100, spaced apart from forward surface 62 of front panel 60 by spacer means or buttons of insulating material 102 to define a void area indicated at 106 therebetween. Membrane 31 is typically an optically transparent polymeric material. Front surface 98 has disposed thereon digits "1" and "2" located within individual character cells 42a discussed in reference to FIG. 3. Oppositely disposed front character cells 42a at rear surface 100 of membrane 31 are conductive elements 104 which traverse rear surface 100 to an edge 108 thereof and extend vertically downward through a conductive portion 110 of spacer element 76 to contact an optically transparent conductive strip 112 which is disposed across front surface 70 of rear panel 68 to an edge 116 thereof. To provide a current path between conductive element 104 and electrode 46a, conductive strip 112 is in contact with the electrode 46a.

Front panel 60 includes an optically transparent conductive flat electrode which is designated as conductive electrode pad 120 disposed on front surface 62 thereof which is adapted to contact conductive electrode 104 when a portion of membrane 31 defined by character cell 42a is depressed inwardly by a finger or stylus across space 106. In order to promote contact between conductive electrode 104 and conductive electrode pad 120, the area of conductive electrode pad 120 is preferably about one-fourth the area of character cell 42. An even larger electrode pad 120 may be utilized to insure contact with conductive electrode 104, however, there is loss in resolution as the size of the pad increases. The conductive electrode pad 120 is in electrical communication with an electrode 50a disposed on rear surface 64, via conductive strip 124 which traverses across front surface 62, around an edge 126 of the panel 60 and across rear surface 64. Conductive electrode pad 120, conductive electrode 104 and conductive strip 112 may be made from indium tin oxide or other similar optically transparent conductive material. When conductive electrode 104 contacts conductive electrode pad 120 in response to a deflection of membrane 31, electrode 50a is placed in electrical communication with electrode 46a producing a conductive path therebetween. Hence, as electrodes 46a and 50a are addressed simultaneously, the electrical contact between the two results in a discrete increase in current due to a load in parallel with the capacitive load defined by electrodes 46a, 50a and the display medium therebetween. The current increase, detected by circuitry in a manner to be described hereinafter, is output as an indentifiable signal pulse which, in conjunction with the touch location detection circuitry 59, identifies the precise location of the "shunted" or "shorted" junction between electrodes 46a and 50a.

While it would be evident to those skilled in the art, it should be noted that it would be possible simply to make the panel 60 flexible so that direct contact would be had between the electrodes 46 and 92. This is feasible; however, for active displays, the current encapsulating material is relatively rigid glass and for passive displays the display medium is sometimes adversely affected by compression so this would not be a preferred embodiment.

As discussed previously, row and column electrodes 46 and 50 are addressed under control of a computer software program. The addresses of the "active" row electrode 46 and "active" column electrode 50 are stored in row and column address registers (not shown) which are updated on a continual basis. The identifiable signal pulse latches the column and row address registers, and the output therefrom is read by a microprocessor in the computer system, thereby providing the instantaneous location of the "shunted" or "shorted" junction which defines the location of the touched character cell 42a on membrane 31. In FIG. 3 this conductive junction corresponds to a character cell location on membrane 31 wherein the digit "1" is located. The digit "1" is accessed in a lookup table in the computer under the address of the conductive junction.

Figure 7:
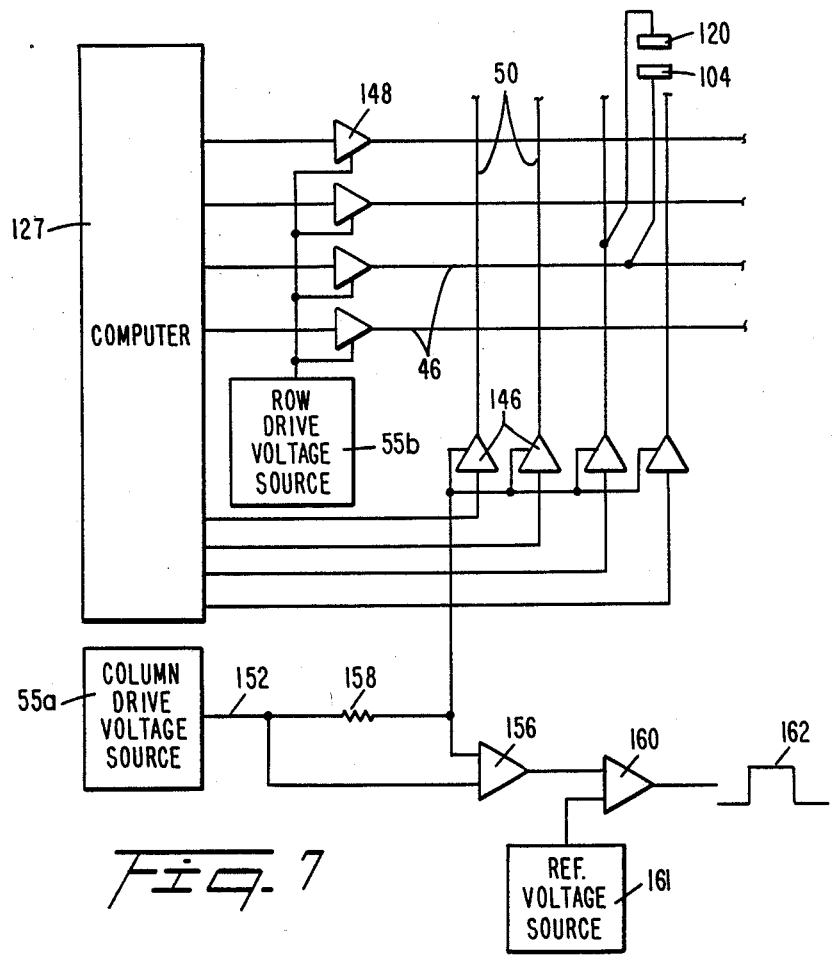
FIG. 7 is a schematic diagram showing the display drive conductive matrix and associated signal generating electronics, which is utilized in the embodiment of FIG. 6, and which provides an identifiable signal output indicative of the touch location relative to the matrix.

In order to describe the sensor circuitry for producing the aforementioned identifiable signal pulse, reference is made to the schematic of FIG. 7 showing a matrix of row and column electrodes 46 and 50 addressed by a computer 127. Column drivers 146 are driven by a column drive voltage source 55a and row drivers 148 by row drive voltage source 55b to apply display command voltages to column and row electrodes 50 and 46.

To sense the current increase due to shunting when one of the column electrodes 50 is conductively contacted with one of the row electrodes 46, a differential amplifier 156 is connected across the resistor 158 which is connected between the column drive voltage source and the drivers 146. Differential amplifier 156 senses the increased voltage across resistor 158 due to the increased current through column lead 152 caused by the aforementioned load. The output from differential amplifier 156 is fed to one of the inputs of a comparator 160, the other input to comparator 160 being connected to a reference voltage source 161 which is set at a predetermined value between the shunting or short circuit voltage and display circuit voltage across resistor 158 to prevent accidental triggering of comparator 160. the output from comparator 160 provides an output signal 162 for latching the address registers (not shown) as described previously.

It will be appreciated that the present invention for detecting the location of a physical deflection of touch sensitive membrane 31 is uniquely distinctive from the aforementioned conventional overlays. Whereas the aforementioned conventional overlays utilize separate touch location addressing electronics 15 (FIGS. 1 and 2) in conjunction with touch location detection circuitry 16 to locate the touch location, the present invention utilizes the display command signals to the selected column and row electrodes which generate the visual display to determine the touch location. This is accomplished in the present invention by providing a conductive path between at least one row and one column of the display matrix to cause a shunting of a portion of the display command signal to that row and column in order to provide an identifiable signal output which in coordination with location detection circuitry 59 determines the address of the pixel location. Without the need for separate touch location addressing electronics, the complexity and expense of the display system of the present invention is significantly reduced.

Referring next to FIG. 8, therein is shown an alternate embodiment of the present invention wherein the deflection of a touch sensitive membrane places a grounded surface in conductive communication with a pixel location of the display activation electronics to produce a discrete signal indicative of the location of the touch relative to the display. FIG. 8 is an exploded cutaway isometric rear view of a portion of a liquid crystal display. Conventional components of a liquid crystal display, known to those with ordinary skill in the art, include a rear optically transparent panel 200 having a front surface 202 which has disposed thereon a conductive layer 204. Spaced apart from rear panel 200 is an optically transparent front panel 208 having a front surface 210 and a rear surface 212. Adjacent to rear surface 212 is an insulating layer 214 which, together with the conductive layer 204, defines a chamber 218 containing the display medium 220 therein.

In order to provide a voltage across chamber 218 there is provided a conductive electrode pad 224 disposed on rear surface 212 of front panel 208 which, in combination with conductive electrode on layer 204 of rear panel 200, provides opposing electrodes for transmitting an electrical potential therebetween. Rear panel 200 would include a rear surface 226 upon which is formed a back polarizer layer 228 and a reflector layer 230 for liquid crystal displays.

To provide the unique properties of the present invention, a conductive matrix is provided including optically transparent conductive source elements 232 spaced apart in a parallel arrangement over rear surface 212. A portion of two of the aforementioned conductive source elements 232b, 232c are shown in FIG. 8. The present invention also includes optically transparent conductive gate elements 234 spaced apart in a parallel arrangement and disposed orthogonally to conductive source elements 232. A portion of two of the aforementioned conductive gate elements 234b, 234c are also shown in FIG. 8.

Each conductive source element 232 and conductive gate element 234 has a unique address. Each crossing of conductive source elements 232 with conductive gate elements 234 defines a junction 238 which is identified by a unique set of column and row coordinates. Separating conductive elements 232 and 234 at junctions 238 are insulative layer 240.

Located at a selected junction, defined by a selected extension 244 of source element 232c and a selected extension 246 of gate element 234c, is one of a plurality of switching means 242 comprising a thin film, field effect transistor or the like. The extension 244 is the source input, and the extension 246 is the gate input. Switching means 242 operates as a voltage controlled switch element which has a low "on" resistance and extremely high "off" resistance. Therefore, when there is sufficient voltage differential between the source input and the gate input, switching means 242 is activated to the "on" position providing a voltage at a drain output 250 thereof which is in communication with electrode pad 224 at contact 252.

In order to provide a voltage across the display medium 220 for a sufficient time to provide a visual display, electrode pad 224 is in electrical communication with a lower conductive pad 256 disposed on rear surface 212 of front panel 208. The capacitive element generally indicated at 260 is formed with insulative material 240 sandwiched between lower conductive pad 256 and conductive gate element 234b. The charge stored in the capacitive element 260 extends the duration of the electrical field across the display medium 220 and, thus, the duration of the activation of the image on the display after the display command signals have passed on the the next junction.

A flexible, optically transparent, overlay 270 is mounted over front surface 210 of front panel 208 and spaced apart therefrom by spacer means 272 to form a space 274 therebetween. Overlay 270 includes an optically transparent conductive electrode layer 276 on a rear surface 280 thereof. To provide electrical contact with the capacitive element 260, a conductive contact element 282 extends through front panel 208 in electrical communication with conductive pad 256 at rear surface 212. Conductive contact element 282 is connected to an additional electrode 286 disposed on front surface 210 of forward panel 208 and adapted to engage conductive electrode layer 276 of overlay 270 when overlay 270 is deflected inward across space 274 by the touch of a finger or conductive stylus. Contact element 282 is in electrical communication with output means 242 via lower conductive pad 256 and electrode pad 224 to form an open circuit. Upon activation of switching means 242 by addressing conductive source element 232c and conductive gate element 234c, a signal is provided along conductive layer 276 of overlay 270 when conductive electrode layer 276 is deflected against the additional electrode 286 thereby completing the circuit.

To provide an identifiable signal indicative of the contact between conductive electrode layer 276 and the additional electrode 286, conductive electrode layer 276 may be connected to a lower potential, such as ground. Upon contact, the current through the switching means 242 is momentarily increased due to the conductive contact or shunting to the lower potential resulting in an increase in current and accompanying voltage drop through the "active" conductive source element 232.

It would be obvious to those skilled in the art, but it should be noted that the conductive electrode layer 276 and overlay 270 could be eliminated by having direct physical contact by the operator so that the operator's body grounds the additional electrode 286. This is true of all the following embodiments. The major advantage is in cost savings, but it has the disadvantage that people vary greatly as conductors and some people cannot activate a touch sensitive display working in this manner.

Referring to FIG. 9, there is shown a schematic of the display control electronics and associated circuitry for generating an identifiable signal in this alternate embodiment of the invention shown in FIG. 8. The schematic of FIG. 9 is similar to that described in reference to FIG. 7 and identical components are designated by like reference numbers having a prime symbol (').

Therein is shown a conductive matrix of source elements 232 and gate elements 234 for addressing switching means 242 in communication therewith. Switching means 242 may be addressed by a multiplexing arrangement wherein a source element 232c is addressed during the time in which gate elements 234a through 234d are addressed from top to bottom. During the time in which source element 232c and gate element 234c are addressed simultaneously, the voltage differential therebetween in sufficient to actuate switching means 242 affecting the voltage at electrode pad 224 (FIG. 8). The number of selected junctions 238 having switching means 242 with conductive element 282 is a function of the desired resolution in defining a touch location. As in the sensor circuitry of the previous embodiment, resistor 158' is connected to a lead 152' between the column drive voltage source 55a' and source element drivers 146'.

Any change in current is sensed across resistor 158' by differential amplifier 156', the output of which provides an input to comparator 160'. Output from comparator 160' produces an identifiable output signal 162' which is used by touch location detection circuitry 59 (FIG. 5) with the display command signals from the column and row address registers to identify the location of the physical deflection of overlay 270 in a manner identical to that discussed with reference to the previous embodiment.

It should be appreciated that the present invention also encompasses a conductive contact element which could directly contact electrode pad 224 of switching means 242 bypassing the capacitive element 260. In addition, switching means 242 need not necessarily comprise a field effect transistor, but may comprise any element which is operable as an electronic switch and which is adapted to receive conductive electrode layer 276 of overlay 270 thereagainst to provide a conductive path for the output of an identifiable signal to coordinate the location of the physical deflection of overlay 270.

The present invention also covers a modification of this embodiment shown in FIG. 10 wherein the application of a voltage that is higher than the column drive voltage source 55a' to the conductive electrode layer 276. This voltage, which would occur at a pixel upon touching contemporaneously with pixel activation, can be sensed by the circuit shown in FIG. 10. The circuit includes a diode 290 connected to a column drive voltage source 55a'. The diode 290 connects to the drivers and to the comparator 160' and provides the same touch indication as the previous embodiments.

Figure 12:
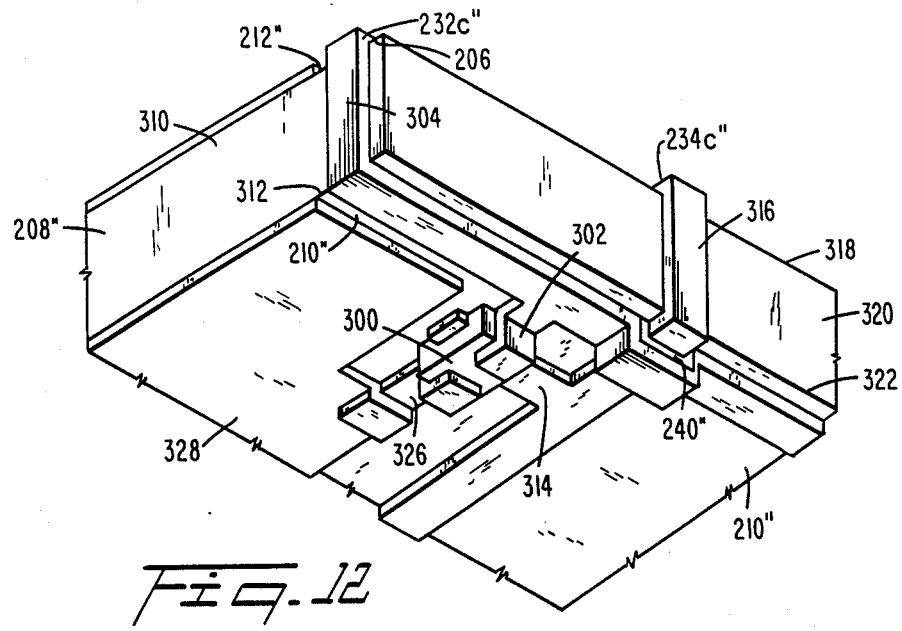
FIG. 12 is an isometric front view of the alternate embodiment shown in FIG. 11.
Figure 13:
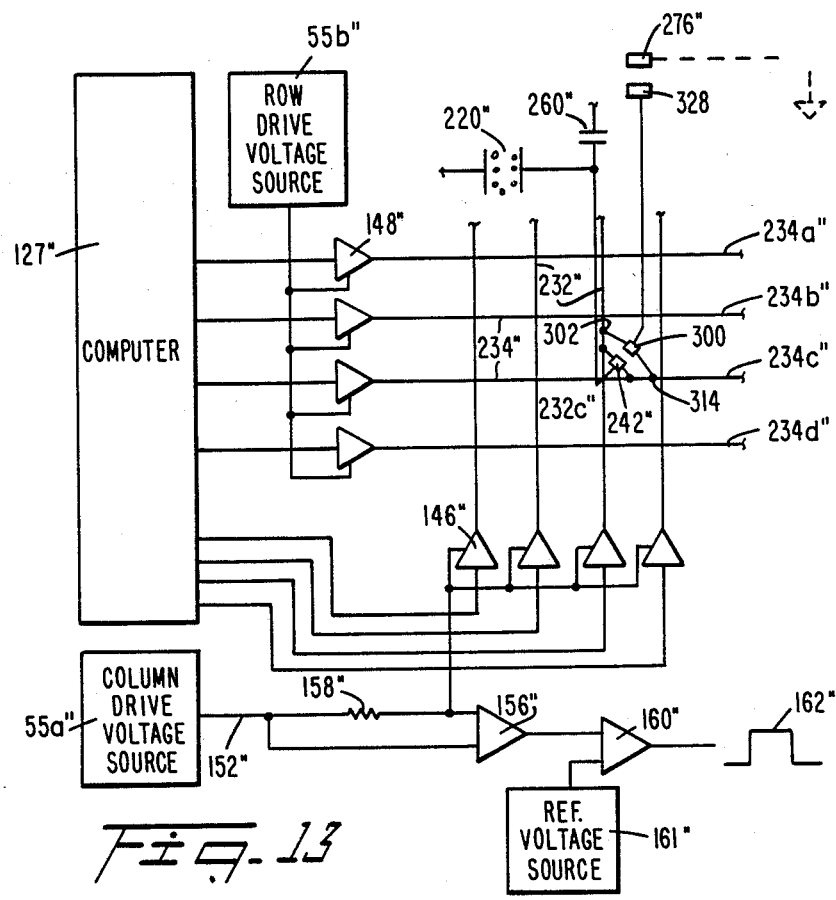
FIG. 13 is a schematic diagram of an exemplary embodiment showing the display drive conductive matrix, and associated signal generating electronics for the embodiment shown in FIGS. 11 and 12.

A further embodiment of the present invention is illustrated in FIGS. 11, 12, and 13 which is similar to the embodiment illustrated in FIG. 8, and wherein like components are identified by like reference numbers with a double prime (") symbol.

In order to increase the signal output to the output location which is conductively contacted to generate an identifiable signal output indicative of the touch location, the conductive source elements 232" and 234" are extended around the ends of the optically transparent front panel 204" to form additional switching means 300 shown in FIG. 12. The operator then makes direct physical contact with a conductive pad in communication with additional switching means 300.

To provide output current for generating an identifiable signal pulse, additional switching means 300, comprising a field effect transistor similar to the switching means 242", is supported on front surface 210" of optically transparent front panel 208 $\propto$ 1. In the present embodiment, conductive contact element 282 and additional electrode 286 are absent. Therefore, the output from the first output means 242" is utilized solely for charging capacitive element 260".

Additional switching means 300 includes a source input 302 in communication with source element 232c" by means of a conductive element 304 which extends around an edge 306 of rear surface 212" at an end of the screen and along a side portion 310 which extends between front surface 210" and rear surface 212" of optically transparent front panel 208". Conductive element 304 extends about an edge 312 of front surface 210" and across front surface 210" to source input 302. Additional switching means 300 also includes a gate input 314 in communication with gate element 234c" by means of a conductive element 316 which extends around an edge 318 of rear surface 212" and along a side portion 320 which extends between front surface 210" and rear surface 212" of front panel 208". Conductive element 316 extends around an edge 322 of front surface 210″ and across front surface 210″ to gate input 314. Additional switching means 300 includes a drain output 326 connected to an additional electrode pad 328 supported on front surface 210″.

Therefore, when there is sufficient voltage differential between source element 232c″ and gate element 234c″, switching means 242″ and additional switching means 300 are turned on simultaneously. This results in a current increase through source element 232c″ and gate element 234c″ when the operator grounds additional electrode pad 328.

Depending on the touch resolution desired, only one additional switching means 300 needs to be used for every 100 to 1000 switching means 242″. The additional electrode pad 328 would typically be much larger than the electrode pad 224″.

Referring to FIG. 13, therein is shown a schematic of the display drive electronics, and associated circuitry for generating the identifiable signal in the exemplary form of the invention shown in Figs. 11 and 12. The schematic of FIG. 13 is similar to that described in Fig. 9. In the present embodiment, the additional switching means 300 are connected in parallel with the switching means 242″ to source elements 232″ and gate elements 234″. Source elements 232″ and gate elements 234″ are driven by computer 127″ via source drivers 146″ and gate drivers 148″ in a multiplexed arrangement. When source element 232c″ and gate element 234c″ are addressed simultaneously and contact is made with additional electrode pad 328, the current through lead 152″ greatly increases causing a voltage change across resistor 158″ which is sensed by differential amplifier 156″. In response to the voltage change across resistor 158″, an output from differential amplifier 156″ causes comparator 160″ to switch thereby outputting identifiable signal 162″ which latches downstream counters (not shown) to determine the address of the touch location in a manner described previously. The present embodiment is unique in that, although the signals on the conductive source elements are shunted, the output through switching means 242″ to the pixel is not shunted or shorted when the display command signals are shunted. This means that only a portion of the display command signals are shunted so that the addressed pixel remains active. In addition, unlike the previous embodiment illustrated in FIG. 8 where both capacitive element 260 and the capacitive load of the additional electrode pad 286 are charged, in the present embodiment only capacitive element 260′ is charged allowing for less variation between display-only pixels and display-touch pixels.

While the present invention is susceptible of various modifications and alternative forms, specific embodiments thereof have been shown by way of example in the drawings and will herein be described in detail. It should be understood, however, that it is not intended to limit the invention to the particular forms disclosed, but on the contrary, the intention is to cover all modifications, equivalents and alternatives falling within the spirit and scope of the invention.

I claim:

1. A touch sensitive visual display system comprising:
    control means for providing a display command signal;
    display means connected to said control means and responsive to said display command signal to provide a visual display indication thereof;
    touch sensitive means conductively connected to said display means through a low resistance DC path, said touch sensitive means being responsive to a touch thereto to establish selectively an electrical conductive shunt of at least a portion of said display command signal from said display means through said DC path thereby changing a value of an electrical parameter of said display command signal; and
    signal means connected with said control means for measuring said electrical parameter of said display command signal for sensing said change in said electrical parameter value caused by said signal shunt from said display means and indicating a simultaneous provision of said display command signal and said touch.

2. The touch sensitive visual display system as claimed in claim 1, wherein:
    said display means includes a first element connected to said control means for receiving said display command signal;
    said touch sensitive means includes a second element connected to said control means for receiving said display command signal and responsive to said touch with said display command signal thereat to cause said shunting of at least a portion of said display command signal; and
    said display means further includes display command signal responsive medium disposed between said first and second elements, said medium responsive to said display command signal at said first and second elements to provide said visual display indication thereof.

3. The touch sensitive visual display system as claimed in claim 1 wherein:
    said display means includes first and second spaced apart electrodes connected with said control means, visual display medium disposed between said first and second electrodes responsive to said display command signal passing between said first and second electrodes to provide an indication thereof, and means for enclosing said first and second electrodes and said visual display medium; and
    said touch sensitive means includes first and second spaced apart conductive elements respectively connected to said first and second electrodes, said first conductive element responsive to said touch thereat to contact said second conductive element to cause said shunting of at least a portion of said display command signal when said display command signal passes between said first and second electrodes.

4. The touch sensitive visual display system as claimed in claim 2 wherein:
    said second element is flexible and is responsive to said touch thereat to contact said first element to cause said shunting of at least a portion of said display command signal therefrom.

5. A touch sensitive visual display system comprising:
    control means for providing a display command signal;
    display means including a first conductive element connected to said control means for receiving said display command signal, said display means being responsive to said display command signal to provide a visual indication thereof;
    touch sensitive means including a second conductive element for receiving a substantial portion of said display command signal; said first and second conductive elements being interconnected through a low resistance DC path to provide a current path between said first and second conductive elements so that said second conductive element can receive said substantial portion of said command signal; said second conductive elements being responsive to a touch with said display command signal thereat to shunt at least a portion of said display command signal from said display means through said DC path thereby changing a value of an electrical parameter of said display command signal; and signal means connected with said control means for measuring said electrical parameter of said display command signal for sensing said change in said electrical parameter value caused by said signal shunt from said display means and indicating a simultaneous provision of said display command signal and said touch.

6. The touch sensitive visual display system as claimed in claim 5 wherein:

said second element is flexible and is responsive to said touch thereat to contact said first element to cause said shunting of at least a portion of said display command signal therefrom.

7. A touch sensitive visual display system comprising:

control means for providing a display command signal;

display means connected to said control means having a plurality of locations for providing a visual display indication when provided with said display command signal;

touch sensitive means conductively connected to said display means through a low resistance DC path, said touch sensitive means having a plurality of locations corresponding to said plurality of locations of said display means responsive to a touch proximate a selected location of said touch sensitive means and a simultaneous provision of said display command signal to said corresponding location of said display means to establish a shunt of at least a portion of said display command signal from said display means through said DC path and thereby changing a value of an electrical parameter of said display command signal; and sensor means connected with said control means for measuring said electrical parameter of said display command signal for sensing said value change caused by said command signal shunt from said display means and providing an indication of the location of said touch on said display means.

8. The touch sensitive visual display system as claimed in claim 7 wherein:

said display means includes a coplanar, spaced apart, plurality of first conductive elements extending in a first direction and connected to said control means to be selectively provided with said display command signal;

said touch sensitive means includes a coplanar, spaced apart, plurality of second conductive elements proximate said plurality of first conductive elements extending in a second direction orthogonally to said first direction and responsive to said touch on one of said second conductive elements with said display command signal on a proximate one of said first conductive elements to cause said shunting of at least a portion of said display command signal from said one of said first conductive elements through said one of said second conductive elements; and said display means further includes display command signal responsive medium disposed between said plurality of first and second conductive elements, said medium responsive to said display command signal passing between one said plurality of first conductive elements and one of said plurality of second conductive elements to provide said visual display indication thereof.

9. The touch sensitive visual display system as claimed in claim 7 wherein;

said display means includes a coplanar, spaced apart plurality of first conductive elements extending in a first direction and connected to said control means to be selectively provided with said display command signal;

said touch sensitive means includes a coplanar, spaced apart plurality of second conductive elements extending proximate said plurality of first conductive elements in a second direction orthogonally to said first direction connected to said control means to be selectively provided with said display command signal and responsive to said touch on one of plurality of said second conductive elements with said display command signal thereat to cause said shunting of at least a portion of said display command signal; and said display means further includes display command signal responsive medium disposed between said plurality of first and second conductive elements, said medium responsive to said display command signal passing between said one of said first conductive elements and one of said second conductive elements to provide said visual display indication thereof.

10. The touch sensitive visual display system as claimed in claim 8 wherein:

said plurality of second conductive elements is disposed on a flexible surface and is responsive to a touch thereon to contact at least one of said first conductive elements to cause said shunting of at least a portion of said display command signal.

11. The touch sensitive visual display system as claimed in claim 9 wherein:

said plurality of second conductive elements is disposed on a flexible surface and is responsive to a touch thereon to contact at least one of said first conductive elements to cause said shunting of at least a portion of said display command signal.

12. A touch sensitive visual display system comprising:

control means for selectively providing a display command signal;

display means having a plurality of locations and responsive to said display command signal for providing a visual display indication;

touch sensitive means having a plurality of locations corresponding to said plurality of locations of said display means and responsive to a touch proximate a selected location of said touch sensitive means and to a simultaneous provision of said display command signal to said corresponding location of said display means for establishing a DC shunt of at least a portion of said display command signal from said display means; and sensor means responsive to said control means for sensing said shunt and providing an indication of the location of said touch on said display means;

said display means including: a coplanar, spaced apart, plurality of first electrodes extending in a first direction and connected to said control means; a coplanar, plurality of second electrodes spaced apart from each other and proximate to and spaced apart from said first electrodes and further extending in a second direction orthogonal to said first direction and connected to said control means; a visual display medium disposed between said plurality of first and second electrodes and responsive to said display command signal passing between one of said plurality of first electrodes and one of said plurality of second electrodes to provide a visual indication of said command signal; and means for enclosing said plurality of first and second electrodes and said visual display medium; and said touch sensitive means including a coplanar, spaced apart, plurality of first conductive elements parallel, proximate, and connected through a low resistive DC path to said plurality of first electrodes; a coplanar, spaced apart, plurality of second conductive elements parallel and proximate to said plurality of first conductive elements and connected through a low resistance DC path to said plurality of second electrodes, said one of said plurality of first conductive elements responsive to said touch thereat to contact said one of said plurality of second conductive elements to provide a low resistance DC current path therebetween and thereby establish said shunt of at least a portion of said display command signal when said display command signal passes between said one of said plurality of first electrodes and one of said plurality of second electrodes.

13. A touch sensitive visual display system comprising:

a source of electrical reference potential;

control means for providing a display command signal;

display means responsive to said display command signal to provide a visual display indication thereof;

touch sensitive means conductively connected to said display means and response to a touch applied thereto selectively apply said display command signal to said source of electrical reference potential to cause a change in a value of an electrical parameter of said display command signal; and sensor means for measuring said electrical parameter of said display command signal to sense said change in said display command signal and in response, indicating the touch and a simultaneous provision to said source of electrical reference potential of said command signal.

14. The touch sensitive visual display system claimed in claim 13, wherein:

said display means includes a first element connected to said control means for receiving said display command signal;

said touch sensitive means includes a second element connected to said control means for receiving said display command signal thereat to apply said display command signal to said source of reference potential; and said display means further includes a display command signal responsive medium disposed between said first and second elements, said medium responsive to said display command signal at said first and second elements to provide said visual display indication thereof.

15. A touch sensitive visual display system comprising:

a source of electrical reference potential;

control means for providing a display command signal;

display means responsive to said display command signal to provide a visual display indication thereof;

said display means including first and second spaced apart electrodes connected with said control means, a visual display medium disposed between said first and second electrodes and responsive to said display command signal passing between said first and second electrodes to provide an indication thereof, and means for enclosing said first and second electrodes and said visual display medium;

touch sensitive means conductively connected to said display means and responsive to a touch applied thereto to selectively apply said display command signal to said source of electrical reference potential to cause a change in said display command signal, said touch sensitive means including first and second spaced apart conductive elements respectively connected to said first and second electrodes, said first conductive elements responsive to said touch thereat to contact said second conductive element to apply said display command signal to said source of reference potential when said display command signal passes between said first and second electrodes; and sensor means for sensing said change in said display command signal and in response, indicating the touch and a simultaneous provision to said source of electrical reference potential of said command signal.

16. A touch sensitive visual system comprising:

control means for providing a display command signal;

display means responsive to said display command signal to provide a visual display indication thereof;

touch sensitive means conductively connected to said display means and responsive to a touch thereto to selectively establish a shunt of at least a portion of said display command signal from said display means and thereby to change a value of an electrical parameter of said display command signal; and sensor means connected to said control means for measuring said change in said electrical parameter value of said display command signal to sense a change in said display command signal caused by said shunt and indicating a simultaneous provision of said display command signal and said touch.

17. The touch sensitive visual display system claimed in claim 16, wherein:

said display means includes a first element connected to said control means for receiving said display command signal;

said touch sensitive means includes a second element connected to said control means for receiving said display command signal thereat to establish said display command signal shunt; and said display means further includes display command signal responsive medium disposed between said first and second elements, said medium responsive to said display command signal at said first and second elements to provide said visual display indication thereof.

18. A touch sensitive visual display system comprising:
control means for providing a display command signal;
display means responsive to said display command signal to provide a visual display indication thereof, said display means including first and second spaced apart electrodes connected with said control means, a visual medium disposed between said first and second electrodes and responsive to said display command signal passing between said first and second electrodes to provide an indication thereof, and means for enclosing said first and second electrodes and said visual display medium;
touch sensitive means conductively connected to said display means and responsive to a touch thereto to establish selectively a shunt of at least a portion of said display command signal from said display means, said touch sensitive means including first and second spaced apart conductive elements respectively connected to said first and second electrodes, and first conductive elements responsive to said touch thereat to contact said second conductive element to establish said shunt when said display command signal passes between said first and second electrodes; and
sensor means connected to said control means for sensing a change to said display command signal caused by said shunt and indicating a simultaneous provision of said display command signal and said touch.

19. A touch sensitive visual display system comprising:
control means for providing a display command signal;
display means having a plurality of locations and responsive to said display command signal for providing a visual display indication;
touch sensitive means conductively connected to said display means and having a plurality of locations corresponding to said plurality of locations of said display means responsive to a touch proximate a selected location of said touch sensitive means and a simultaneous provision of said display command signal to said corresponding location of said display means to shunt at least a portion of said display command signal thereby changing a value of an electrical parameter of said display command signal; and
sensor means connected with said control means for measuring said change in said electrical parameter value of said display command signal for sensing change in said display command signal caused by said shunting of at least a portion of said display command and providing an indication of the location of said touch on said display means.

20. The touch sensitive visual display system as claimed in claim 19 wherein;
said display means includes a coplanar, spaced apart plurality of first conductive elements extending in a first direction and connected to said control means to be selectively provided with said display command signal;
said touch sensitive means includes a coplanar, spaced apart plurality of second conductive elements extending proximate said plurality of first conductive elements in a second direction orthogonal to said first direction connected to said control means to be selectively provided with said display command signal and responsive to said touch on one of said plurality of said second conductive elements with said display command signal thereat to establish said shunt; and
said display means further includes a display command signal responsive medium disposed between said plurality of first and second conductive elements, said medium responsive to said display command signal passing between said one of said first conductive elements and one of said second conductive elements to provide said visual display indication thereof.

21. A touch sensitive visual display system comprising:
control means for providing a display command signal;
display means having a plurality of locations and responsive to said display command signal for providing a visual display indication;
said display means including a coplanar, spaced apart, plurality of first electrodes extending in a first direction and connected to said control means; a coplanar, spaced apart, plurality of second electrodes proximate and spaced apart from said first electrodes and extending in a second direction orthogonal to said first direction and connected to said control means; a visual display medium disposed between said plurality of first and second electrodes and responsive to said display command signal passing between one of said plurality of first electrode and one of said plurality of second electrodes to provide a visual indication thereof; and means for enclosing said plurality of first and second electrodes and said visual display medium;
touch sensitive means conductively connected to said display means and having a plurality of locations corresponding to said plurality of locations of said display means responsive to a touch proximate a selected location of said touch sensitive means and a simultaneous provision of said display command signal to said corresponding location of said display means to shunt at least a portion of said display command signal, said touch sensitive means including a coplanar, spaced apart, plurality of first conductive elements parallel, proximate, and connected to said plurality of first electrodes; a coplanar, spaced apart, plurality of second conductive elements parallel to and proximate said plurality of first conductive elements and connected to said plurality of second electrodes, said one of said plurality of first conductive elements responsive to said touch thereat to contact said one of said plurality of second conductive elements to establish said shunt when said display command signal passes between said one of said plurality of first electrodes and one of said plurality of second electrodes; and
sensor means connected with said control means for sensing a change in said display command signal caused by said shunting of at least a portion of said display command and providing an indication of the location of said touch on said display means.

22. A touch sensitive visual display comprising:
control means for selectively providing first and second display command signal;
display means including first and second conductive elements connected to said control means, first and second spaced apart electrodes, a display medium disposed between said first and second electrodes responsive to one of said display command signals provided to said first and second electrodes to provide a visual indication thereof, and switching means connected to said first and second conductive elements and to said first and second electrodes responsive to said first and second display command signals at said first and second conductive elements to provide one of said display command signal to said first and second electrodes;
touch sensitive means connected with one of said electrodes responsive to a touch proximate thereto to selectively shunt at least a portion of said one of said display command signals to said first and second electrodes through a low resistance DC path thereby changing a value of an electrical parameter of said one of said display command signals.
sensor means connected to said control means for sensing said change in said electrical parameter value of said one of said display command signals to sense said shunt of at least a portion of said one of said display command signals to provide an indication thereof indicative of the simultaneous providing of said first and second display command signals to said first and second electrodes and a touch proximate said one of said electrodes.

23. The touch sensitive visual display system as claimed in claim 22 wherein:
said touch sensitive means includes a first conductive pad in conductive connection with said first electrode and a second conductive pad responsive to a touch thereat to flex and contact said first conductive pad to cause said shunting of at least a portion of one of said display command signals.

24. The touch sensitive visual display system as claimed in claim 22 wherein:
one of said conductive elements is disposed proximate one of said electrodes to form a capacitive element therebetween.

25. A touch sensitive visual display comprising:
control means for selectively providing first and second display command signals;
display means including first and second conductive elements connected to said control means, first and second spaced apart electrodes, a display medium disposed between said first and second electrodes responsive to one of said display command signals provided to said first and second electrodes to provide a visual indication thereof, and first switching means connected to said first and second conductive elements responsive to said first and second display command signals thereat to provide one of said display command signals to said first and second electrodes;
touch sensitive means including a first electrode adjacent said first electrode of said display means and second switching means connected to said first and second conductive elements responsive to said first and second display command signals to provide one of said display command signals to said first electrode of said touch sensitive means, said first electrode of said touch sensitive means responsive to a touch proximate thereto to selectively shunt at least a portion of said one of said display command signals from one of said conductive elements through a low resistance DC path thereby changing a value of an electrical parameter of said one of said display command signals; and
sensor means connected to said control means for sensing said change in said electrical parameter value of said one of said display command signals to sense said shunting of at least a portion of said one of said display command signals to provide an indication thereof indicative of the simultaneous providing of said first and second display command signals to said first and second electrodes and a touch proximate said first electrode of said touch sensitive means.

26. The touch sensitive visual display system as claimed in claim 25 wherein:
said touch sensitive means includes a second electrode responsive to a touch thereat to flex and contact said first electrode of said touch sensitive means to cause said shunting of at least a portion of one of said display command signals.

27. The touch sensitive visual display system as claimed in claim 25 wherein:
one of said conductive elements is disposed proximate one of said electrodes of said display means to form a capacitive element therebetween.

28. The touch sensitive visual display system as claimed in claim 25 wherein said switching means comprises field effect transistors.

29. The touch sensitive visual display system as claimed in claim 25 including means encapsulating said first and second electrodes and said display medium.

30. The touch sensitive visual display system as claimed in claim 25 including means flatly encapsulating said first and second electrodes and said display medium, wherein said first electrodes of said touch sensitive means are disposed outside of said encapsulating means.

31. The touch sensitive visual display system as claimed in claim 26 including means flatly encapsulating said first and second electrodes and said display medium, wherein said first electrodes of said touch sensitive means are disposed outside of said encapsulating means.

32. The touch sensitive visual display system as claimed in claim 25 wherein said display medium is selected from the group consisting of liquid crystal, gas plasma, vacuum fluorescent, this film electroluminescent, electrophoretic and electrochromic materials.

33. The touch sensitive visual display system as claimed in claim 25 wherein said display command signals are multiplexed alternating current voltages.

34. A touch sensitive visual display comprising:
control means for selectively providing first and second display command signals;
display means including a plurality of parallel spaced apart first conductive elements connected to said control means, a plurality of parallel spaced apart second conductive elements connected to said control means disposed orthogonally to said plurality of first conductive elements to form a matrix therewith, a plurality of spaced apart first electrodes disposed adjacent locations wherein said first and second elements are proximate, a second electrode spaced apart from said plurality of first electrodes and connected to said control means, display medium disposed between said plurality of first electrodes and said second electrode responsive to one of said display command signals provided to one of said plurality of first electrodes and said second electrode to provide a visual indication thereof proximate one of said plurality of first electrodes, and a plurality of first switching means individually proximate one of said plurality of first electrodes connected to said first and second conductive elements responsive to said first and second display command signals thereat to provide one of said display command signals to one of said plurality of first electrodes and said second electrode;

touch sensitive means including a plurality of first electrodes individually adjacent one of said first electrodes of said display means and a plurality of second switching means individually proximate one of said first electrodes of said touch sensitive means connected to said first and second conductive elements responsive to said first and second display command signals to provide one of said display command signals to said first electrode of said touch sensitive means, each of said first electrodes of said touch sensitive means responsive to a touch proximate thereto to selectively shunt at least a portion of said one of said display command signals from one of said conductive elements through a low resistance DC path thereby changing a value of an electrical parameter of said one of said display command signals; and sensor means connected to said control means for sensing said change in said electrical parameter value of said one of said display command signals to sense said shunt of at least a portion of said one of said display command signals to provide an indication thereof indicative of the simultaneous providing of said first and second display command signals to said one of said plurality of said first electrodes and said second electrode and a touch proximate one of said first electrodes.

35. The touch sensitive visual display system as claimed in claim 34 wherein:

said touch sensitive means includes a second electrode spaced apart from said plurality of first electrodes responsive to a touch thereat to flex and contact one of said plurality of first electrodes to cause said shunt of at least a portion of said display command signal.

36. The touch sensitive visual display system as claimed in claim 34 wherein said switching means comprises field effect transistors.

37. The touch sensitive visual display system as claimed in claim 34 including means encapsulating said first and second electrodes and said display medium.

38. The touch sensitive visual display system as claimed in claim 34 wherein said display medium is selected from the group consisting of liquid crystal, gas plasma, vacuum fluorescent, thin film electroluminescent, electrophoretic and electrochromic materials.

39. The touch sensitive visual display system as claimed in claim 34 wherein said display command signals are multiplexed alternating current voltages.

* * * * *